Patented Sept. 29, 1942

2,297,660

UNITED STATES PATENT OFFICE 2,297,660

NONAQUEOUS DRILLING FLUID

Willem Martin Mazee, Amsterdam, Netherlands, assignor to Shell Development Company, San Francisco, Calif., a corporation of Delaware No Drawing. Application July 27, 1940, Serial No. 348,032. In the Netherlands November 16, 1939

7 Claims. (Cl. 252—8.5)

This invention pertains to improvements in non-aqueous drilling fluids for use in drilling wells and relates more particularly to the use of stabilizing agents in non-aqueous drilling fluids containing weighting materials which have a tendency to settle out.

In the art of drilling wells through certain formations, such for example, as oil bearing layers which may be plugged if an aqueous liquid is forced thereinto, or the so-called heaving shales, which swell and disintegrate on contact with water, it is often desirable to use non-aqueous drilling fluids to prevent the walls of the borehole from caving in. Such water-free drilling fluids are commonly composed of a suspension of a finely divided solid material in a non-aqueous liquid. Ordinarily, such solid substances, or weighting materials, in non-aqueous suspensions have an excessive tendency toward sedimentation, and to overcome this deficiency, metal soaps of saturated or singly-unsaturated carboxylic acids, such as oleic, stearic, and palmitic acids, have been proposed as stabilizing agents. However, such stabilizing agents as these are often unsatisfactory and fail to prevent substantial amounts of sedimentation of the solid materials in non-aqueous drilling fluids.

It is therefore an object of the present invention to provide an improved non-aqueous drilling fluid comprising an alkali soap of those carboxylic or poly-olefinic acids which are highly unsaturated, that is, which have two or more double bonds in the molecule, the alkali soaps of said acids having been now found to be of considerably greater effectiveness as stabilizing agents for oil base drilling fluids than the soaps of the unsaturated carboxylic acids previously used.

In preparing a water-free drilling fluid according to the present invention, any suitable non-aqueous liquid may be used as the suspending medium for example, crude oil, gas oil, kerosene, coal tar distillates, vegetable or animal oils, alcohols, ketones, turpentine, etc., or mixtures thereof.

In order to reduce the danger of fire while at the same time increasing the specific gravity of the drilling fluids, halogenated hydrocarbons such as carbon tetrachloride, trichlor ethylene, chloro- or bromo-form, etc., may be added thereto in any desired amounts, such, for example, as 15% by weight of the suspending liquids.

The solid substances or weighting materials which may be suspended, preferably in suitably comminuted form, in the above liquids to form the drilling fluid are: clay, ground shells, limestone, magnetite, haematite, barytes, lead compounds, such as lead oxides and sulfides, iron compounds, etc. Further, substances which promote the formation of a relatively strong and impervious sheath on the walls of the borehole, such as mica or glimmer, glass wool, sawdust, rice husks, ground asbestos, blown asphalt, etc., may also be added to the drilling fluid to shut off the porous layers passed through.

As stabilizing agents for preventing sedimentation of solid materials in non-aqueous drilling fluids, the alkali soaps of the higher polyolefinic carboxylic acids, that is, those having at least two double bonds in the molecule, have been found to be surprisingly effective for this purpose. By higher carboxylic acids are meant the fatty acids having at least ten carbon atoms per molecule. For example, the soaps of the following fatty acids may be used according to this invention: diolefinic acids, such as geranic acid, palmitolic acid, linolic acid, humoceric acid, eicosinic acid, triolefinic acids, such as dehydrogeranic acid, linolenic acid, elaeostearic acid, tetraolefinic acids, such as clupanodonic acid, and further fatty acid substances containing these or similar highly unsaturated fatty acids, such as for instance, the fatty acid mixtures prepared from train oil, soya bean oil, whale oil, linseed oil, and Chinese wood oil.

Further, both anhydrous and hydrated soaps of the above acids may be used according to the present invention. For example, the hydrated soaps such as the soft commercial soaps, or yellow or brown soap, are particularly suitable. Mixtures of these various soaps may likewise be applied.

The alkali metals, such as sodium and potassium, as well as ammonia may be used in the preparation of the alkali soaps of the above higher unsaturated carboxylic acids for the purpose of this invention. At the higher temperatures sometimes encountered in drilling the alkali metal soaps, such as the sodium and particularly the potassium soaps, are preferred.

For the purpose of the present invention the polyolefinic soaps may be used in amounts from about 0.2% to about 7% by weight of the drilling fluid, depending on the gravity and other properties of the particular drilling fluid used.

Especially effective results are obtained when a free base, such as potassium, sodium or ammonium hydroxides in small amounts such as one to five per cent or more on the basis of the soap, is added along with the soap to the non-aqueous drilling fluid. If the oil used in preparing the drilling fluid is acidic, a larger amount, such as to about 0.1% on the basis of the drilling fluid, of a free base may be added.

The advantages obtained by adding these stabilizing agents to non-aqueous drilling fluids are illustrated by the following table, showing the per cent sedimentation by volume of several drilling fluid samples after standing for twenty-four hours at about 20° C. and at about 70° C. The samples were prepared by adding 1% by weight of a soap to a drilling fluid composed of 70 parts by weight of a California crude oil, 20 parts by weight of ground shells, and 10 parts by weight of blown asphaltic bitumen. The added soaps contained in addition 2% by weight of potassium hydroxide, calculated on the quantity of the soap.

Table

| Exp. No. | Soap used | At 20° C. | | At 70° C. | |
|---|---|---|---|---|---|
| | | Sedimentation | Nature of sediment | Sedimentation | Nature of sediment |
| | | Per cent | | Per cent | |
| 1 | Potassium stearate | 15 | Solid | 20 | Solid. |
| 2 | Potassium oleate | 10 | Fairly solid. | 20 | Do. |
| 3 | Potassium linolate | 0 | | 2 | Fairly loose. |
| 4 | Sodium linolate | 0 | | 6 | Do. |
| 5 | Potassium soaps of linseed oil fatty acids. | 0 | | 0 | |
| 6 | Sodium soaps of linseed oil fatty acids. | 0 | | 6 | Do. |

It will be seen from this table that the polyolefinic soaps of the present invention are considerably more effective than soaps prepared from saturated carboxylic acids, or from unsaturated carboxylic acids having only one double bond. Non-aqueous drilling fluids containing the present soaps have also good plastering and deplastering properties, particularly when blown asphalt is added thereto.

I claim as my invention:

1. A drilling fluid comprising a non-aqueous suspending liquid, a finely divided solid suspended material, a small quantity of an alkali metal soap of an unsaturated carboxylic acid having more than ten carbon atoms and at least two double bonds, and a small amount of a free base.

2. A drilling fluid comprising a non-aqueous suspending liquid, a finely divided solid suspended material and a small quantity of an alkali metal soap of an unsaturated carboxylic acid having more than ten carbon atoms and at least two double bonds in the molecule.

3. A drilling fluid comprising a non-aqueous suspending liquid, a finely divided solid suspended material and a small quantity of a potassium soap of an unsaturated carboxylic acid having more than ten carbon atoms and at least two double bonds in the molecule.

4. A water-free drilling fluid comprising a non-aqueous suspending liquid, a finely divided solid suspended material and a small quantity of an alkali metal soap of linolic acid.

5. A water-free drilling fluid comprising a non-aqueous suspending liquid, a finely divided solid suspended material, and a small quantity of potassium linolate.

6. A water-free drilling fluid comprising a suspension of finely ground shells in a heavy oil and containing 8%–15% by weight of blown asphalt and approximately 1% by weight of the potassium soap of linseed oil fatty acids.

7. A drill fluid comprising a non-aqueous suspending liquid, a finely divided solid suspended material, blown asphaltic bitumen and a small quantity of an alkali metal soap of an unsaturated carboxylic acid having more than 10 carbon atoms and at least two double bonds in the molecule.

WILLEM MARTIN MAZEE.